United States Patent [19]
Keister et al.

[11] 3,760,349
[45] Sept. 18, 1973

[54] EMERGENCY WARNING SYSTEM

[76] Inventors: Douglas W. Keister, 1143 Brittmor, Rt. 8 Box 674, Houston, Tex. 77024; Russel B. Leibfreid, 2113 Potomac Dr., Houston, Tex. 77027

[22] Filed: June 21, 1971

[21] Appl. No.: 155,117

[52] U.S. Cl. .................................................. 340/33
[51] Int. Cl. ............................................. G08g 1/00
[58] Field of Search ..................... 340/32, 33, 213.1

[56] References Cited
UNITED STATES PATENTS

| | | |
|---|---|---|
| 3,233,217 | 2/1966 | Bost ....................................... 340/33 |
| 3,293,600 | 12/1966 | Gifft ....................................... 340/33 |
| 3,114,127 | 12/1963 | Ramsey ................................. 340/32 |
| 3,371,278 | 2/1968 | Gelushia et al. ................... 340/32 X |

*Primary Examiner*—William C. Cooper
*Attorney*—W. F. Hyer et al.

[57] ABSTRACT

An emergency warning system is disclosed which includes a transmitter adapted to be mounted in an emergency vehicle, such as an ambulance or police car, and a receiver adapted to be mounted in another vehicle such as a private automobile. The transmitter emits coded signals in response to actuation of the vehicle's siren or other emergency device, and the receiver responds to receipt of only the coded transmitted signals when the emergency vehicle and another vehicle are in close proximity to provide visual or audio signals to the driver of another vehicle to warn him of the proximity of the emergency vehicle. A switch is provided in the receiver to override the audio warning signal received by the driver of another vehicle, and the switch is automatically reset by loss or reduction of signal from the transmitter of the emergency vehicle.

9 Claims, 2 Drawing Figures

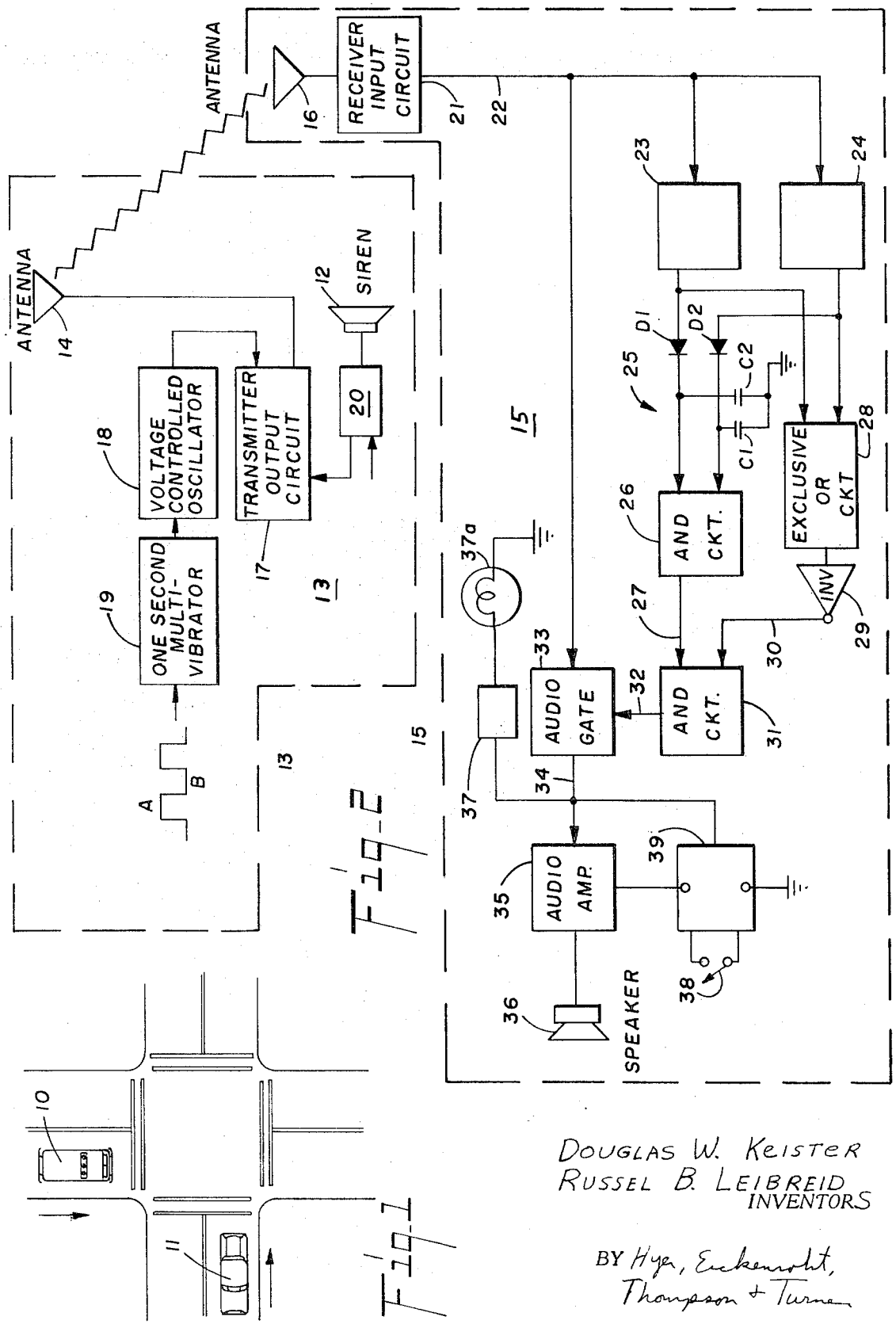

EMERGENCY WARNING SYSTEM

This invention relates to an emergency warning system and in one of its aspects to such a system which provides for audio-visual indication inside of one vehicle of the proximity of another vehicle, such as an approaching emergency vehicle.

With the advent of air conditioning in private automobiles, along with radios and stereo systems inside the car, it is often difficult to hear the siren or whistle of an approaching emergency vehicle or train. As a result, many collisions have occurred at intersections between fast moving emergency vehicles and private vehicles, or between two emergency vehicles, even though sirens or emergency warning lights are being used by the emergency vehicles. Also, numerous collisions have occured between trains and cars at railroad crossings because of the inability of the private car operator to hear an approaching train whistle. Although various types of warning systems have been proposed in the prior art to help avoid such collisions, none of these proposed systems are presently in general use because of their cost, complexity or lack of reliability. In order for such a warning system to be effective, it must be of such design and construction that it can readily be adapted for general use in all types of vehicles subject to collision with each other.

It is thus the primary object of this invention to provide such an emergency warning system which will provide a private automobile operator with an indication inside his car of the proximity of an approaching emergency vehicle, so that it is unnecessary for the private car operator to see approaching warning lights or hear an approaching siren.

Another object of this invention provides such a warning system which is relatively inexpensive and simple to manufacture, and reliable, and is thus readily adapted for general use in all types of motor vehicles subject to collision with each other.

Another object of this invention is to provide such a warning system which utilizes a special transmitter in an emergency vehicle transmitting a distinctive security code so that spurious signals do not result in false indications of the approach of an emergency vehicle.

Another object of this invention is to provide such a system which responds automatically without the need of operator intervention to transmit the transmitted security code and to receive it at one or more vehicles equipped with a receiver adapted to respond only to the transmitted code.

Another object of this invention is to provide such a system in which the receiver may include both an audio and visual alarm, and the operator of the vehicle equipped with such a receiver may cut off the audio alarm when desired, such as when he is aware of the presence of an emergency vehicle and is travelling in close proximity to it, but the audio alarm will be automatically reset for succeeding operation without relying upon the operator to reset it.

These and other objects of this invention are accomplished, according to the illustrated preferred embodiment of this invention, by providing a transmitter in an emergency vehicle, such as an ambulance or police car, and a receiver in private passenger cars, which are subject to meeting such an emergency vehicle at a dangerous intersection. A specific coded sequence of signals is provided by the emergency vehicle transmitter to provide a transmitted security code, and a receiver in each private car is designed to respond only to these signals to provide a visual indication, such as on a light, and an audio indication such as by a tone from a speaker. This security code prevents the receiver from responding to many spurious signals and providing false indications to the operator of the private car of the approach of an emergency vehicle.

The receiver preferably includes both an audio and visual warning, and as long as the vehicle with a receiver in it is in the proximity of a speeding emergency vehicle, the audio and visual alarms will continue to function until the emergency vehicle is of sufficient distance from the receiver vehicle that loss of transmitted signal occurs. A switch means is provided which permits the operator of the receiver vehicle to cut off the audio alarm, and the switch means is connected to respond to the input received signals so that it is automatically reset when the level of the input signal falls below a predetermined level.

In the drawings, wherein like reference numerals are used throughout to designate like parts;

FIG. 1 is a diagramatic illustration of an emergency vehicle having the transmitter of the warning system of this invention approaching an intersection at the same time as another vehicle equipped with the receiver of the warning system of this invention.

FIG. 2 is a block, schematic diagram of the transmitter and one of the receivers utilized in a preferred form of the warning system of this invention.

Referring to the drawings, FIG. 1 illustrates an emergency vehicle 10 approaching a street intersection at the same time as another vehicle 11. Emergency vehicle 11 includes a siren 12, a transmitter 13, and a transmitting antenna 14, so that, in accordance with the present invention, transmitter 13 is turned on automatically when siren 12 is turned on and transmits a distinctively coded radiated energy signal (such as a radio frequency signal) from antenna 14. Also, in accordance with this invention, vehicle 11 may include a receiver 15 connected to a receiving antenna 16 and operable in response to receipt of said distinctively coded signals to actuate an alarm mechanism in the vehicle and alert the operator of the close proximity of emergency vehicle 10.

FIG. 2 illustrates the details of both transmitter 13 and receiver 15, it being understood that similar transmitters may be installed in all types of emergency vehicles or even a train, and similar receivers may be installed in all other vehicles (including emergency vehicles) subject to collision with vehicle 10. Transmitter 13 preferably transmits a series of distinctively coded signals which include successive tone signals of alternating different frequencies. Of course, other distinctive codes can be utilized as long as the code provides sufficient security to prevent unnecessary actuation of the receiver alarm mechanism in response to spurious signals, which would have the effect of reducing the confidence of the operator of a vehicle 11 in the integrity of the system. The desired transmitted coded signal is provided by modulating the transmitter output circuit 17 of transmitter 13 with a voltage control oscillator 18 which provides two modulating tone outputs, for example, one output of 1 Khz and a second output of 500 Hz. The sequence of operation of oscillator 18 is controlled by a one second multivibrator 19 which provides alternate high and low outputs A and B of one second duration. When output A of one second duration is provided by multivibrator 19, oscillator 18 responds thereto to produce its high frequency tone (i.e., 1 Khz) output to modulate the output of transmitter circuit 17 with a 1 Khz tone. When multivibrator 19 provides its one second duration low output B, oscillator 18 responds thereto to produce its low frequency tone (i.e., 500 Hz) output to modulate the output from circuit 17. Thus, when transmitter 13 is operating, a signal will be transmitted from antenna 14, connected to the output of circuit 17, which includes modulating tones of 1 second duration having alternate high and low frequencies. It is preferred that the power circuits for operating transmitter 13 be connected through the switching circuits 20 of siren 12 so that when siren 12 (or the emergency warning lights of vehicle 10) is turned on transmitter 13 is also automatically turned on.

Receiver 15 includes a receiver input circuit 21 connected to receiver antenna 16, and the input circuit receives the transmitted signals from a transmitter 13 and demodulates this signal to provide a series of tone signals identical to the tone signals modulating the output of transmitter 13. Thus, with receipt of the transmitted distinctive signal described above, the output signal from circuit 21, on line 22, will be successive high and low tones (i.e., 1 Khz and 500 Hz) of one second duration. It is desired that the input circuit 21 of receiver 15 be highly selective and tuned (along with antenna 16) to the transmitting frequency of transmitter 13 so that annoying radiated energy signals on other frequencies are greatly attenuated. The output 22 of receiver input circuit 21 is connected to a selective first circuit 23 and a selective second circuit 24. The selective first circuit 23, which may be a highly selective band pass circuit, responds only to the higher tone signal on line 22 (for example, 1 Khz) to produce a first signal at its output. The selective second circuit 24, which may also be a highly selective band pass circuit, responds only to the lower tone signal on line 22 (for example, 500 Hz.) to produce a second signal at its output. The output of first circuit 23 is connected through a rectifying and filter circuit 25 including diode $D_1$ and capacitor $C_1$ to an input of a first AND circuit 26. The output of second circuit 24 is also connected through rectifying and filtering circuit 25 including diode $D_2$ and capacitor $C_2$ to another input of first AND circuit 26. Thus, whenever circuits 23 and 24 produce alternating outputs indicative of receipt of the proper alternating tone signals, these outputs are rectified in circuit 25 and applied as high level D.C. signals to the inputs of AND circuit 26. When both the inputs of AND circuit 26 are high, a high level output is produced on line 27. Since both the inputs to AND circuit 26 must be high in order to produce the output 27, rectifying circuit 25 arms one of the inputs with a high input until the other input signal is received. However, the second input must be received in a short enough time interval after the other input of circuit 26 is armed so that the arming signal does not drop out. This is preferably accomplished by having successive tone signals for the distinctive code, each of, for example, one second duration.

The outputs of circuits 23 and 24 are also directly connected to separate inputs of an OR circuit 28, and when one of these outputs is high and the other is low, OR circuit 28, through an inverter 29, produces an output signal on line 30. Both outputs 27 and 30 are connected to the inputs of a second AND circuit 31, and when both of these outputs are high, AND circuit 31 produces an alarm control signal on output line 32. Line 32 is connected to one input of an audio gate 33 which is also connected to line 22 so that when the alarm control signal is present on line 22, gate 33 produces an audio output at its output 34 which is the demodulated tone (successive high and low tones) from circuit 21. The output 34 of gate 33 is connected to an audio amplifier 35 which has a speaker 36 connected to its output so that the tone signal is amplified to alert the operator of vehicle 11 of the proximity of vehicle 10. Also, output 34 may be connected through a lamp control circuit 37 to a lamp 37a (which may be flashing or steady) to alert the operator of the proximity of vehicle 11.

It is also preferred that a switch means be provided so that the operator of vehicle 11 may turn off the audio alarm from speaker 36, such as when he is travelling for some distance in close proximity to vehicle 10 and is aware of it. For this purpose, a manual switch 38 is provided to cut off amplifier 35, and switch 38 is connected to operate an electronic switching circuit 39. When switch 38 is actuated to turn off amplifier 35, the electrical switch circuit includes an electronic latch, for example, a flip flop which is switched to a state which turns amplifier 35 off. However, circuit 39 is also connected to output 34, and when the signal level at output 34 falls below a predetermined level, indicative of loss of signal from transmitter 13, then electronic switching circuit 39 automatically changes state to latch circuit 39 to turn amplifier 35 on, so that the next received warning signal from transmitter 13 will again actuate the audio alarm. This switching occurs automatically without the need of operator intervention.

It is preferred that the separate assemblies forming transmitter 13 and receiver 15 be constructed of solid state electronic components and potted in epoxy or other rigid material, so that it will be difficult for the operator to change any of the circuit values which determine the security of the system. All of the components are relatively inexpensive and easily obtained, so that the system is readily adapted for mass manufacture and can be standard required equipment on automobiles. Also, it is not necessary that the output power of transmitter 13 be great, since the distances between emergency vehicle 10 and vehicle 11 will not be great. However, the output power from transmitter 13 and the frequency of transmission used should be such that satisfactory reception will be provided in areas with buildings and other obstructions or interfering objects. Also, the detailed circuitry utilized in transmitter 13 and receivers 15 may take many different forms and may transmit and receive on any appropriate frequency as long as sufficiently distinct signals are utilized as the transmitted signal so that undue interference by other transmitted signals is prevented. Squelch and noise limiting circuits may also be employed in the receiver circuitry to further reduce interference and increase the integrity of the system.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations.

This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An emergency warning system comprising, in combination: a transmitter adapted to be mounted in an emergency vehicle, said transmitter including means for transmitting a radio frequency carrier signal including a distinctly coded signal having at least two distinctive coding characters to represent proximity of a single emergency vehicle; means for modulating said radio frequency signal with at least two tone signals to provide said at least two distinctive coding characters; a plurality of receiving means each adapted to be mounted in another vehicle for receipt of transmitted signals from said transmitting means, each of said receiving means including decoding means for decoding said distinctly decoded signal when received, said decoding means including means to provide a separate signal responsive to each of said distinctive coding characters, and means responsive to said separate signals when at least one of said signals follows a previously generated, of said signals within a predetermined time period to provide an alarm control signal; a distinctive alarm mechanism; and means responding only to said alarm control signal to actuate said alarm mechanism whereby actuation of said alarm mechanism is indicative of proximity of said emergency vehicle to said another vehicle.

2. The system of claim 1 wherein said alarm mechanism includes an audio alarm and further including switch means for turning off said audio alarm at any time during receipt of said distinctly coded signals, and means responding to the level of said received distinctively coded signals to automatically reset said switch means when said level is below a predetermined level.

3. The system of claim 1 wherein said alarm mechanism includes both an audio alarm and a visual alarm.

4. The system of claim 2 wherein said alarm mechanism further includes a visual alarm.

5. The system of claim 1 wherein said transmitted distinctively coded signal includes successive tone signals of different frequency each transmitted for a predetermined duration, and said decoding means responds to receipt of said successive tone signals in a predetermined sequence to provide said alarm control signal.

6. The system of claim 5 wherein said decoding means includes first circuit means responding only to receipt of the first of said successive tone signals to provide a first signal having a duration longer than said first of said successive tone signals, second circuit means responding only to receipt of a different successive tone signal to provide a second signal overlapping with said first signal, and means responding to said first and second signals to provide said alarm control signal.

7. The system of claim 6 wherein said decoding means includes a first AND circuit having its inputs connected respectively to the outputs of said first and second circuit means, and providing a third signal in response to both of said first and second signals; an OR circuit having its inputs respectively connected to the outputs of said first and second circuit means and providing a fourth signal in response to one of said first and second signals, and a second AND circuit connected at its inputs respectively to the outputs of said first AND and said OR circuit and responding to both said third and fourth signals to provide said alarm control signal.

8. The system of claim 7 wherein said alarm mechanism includes an audio alarm and further including switch means for turning off said audio alarm at any time during receipt of said distinctly coded signals, and means responding to the level of said received distinctively coded signals to automatically reset said switch means when said level is below a predetermined level.

9. The system of claim 1 further including means in the transmitter for automatically actuating the transmitter in response to operation of other emergency warning equipment on a vehicle.

* * * * *